United States Patent [19]

Endo et al.

[11] Patent Number: 4,743,973

[45] Date of Patent: May 10, 1988

[54] ENCODING METHOD FOR FACSIMILE SIGNAL

[75] Inventors: Toshiaki Endo, Tanashi; Yasuhiro Yamazaki, Hiratsuka, both of Japan

[73] Assignee: Kokusai Denshin Denwa Co., Ltd., Tokyo, Japan

[21] Appl. No.: 886,952

[22] Filed: Jul. 24, 1986

Related U.S. Application Data

[63] Continuation of Ser. No. 519,662, Aug. 2, 1983, abandoned.

[30] Foreign Application Priority Data

Aug. 4, 1982 [JP] Japan ............................... 57-135967

[51] Int. Cl.[4] ............................................... H04N 1/41
[52] U.S. Cl. ...................................... 358/260; 358/133
[58] Field of Search .............. 358/133, 135, 136, 260, 358/261

[56] References Cited

U.S. PATENT DOCUMENTS

| | | | |
|---|---|---|---|
| 4,134,133 | 1/1979 | Teramura et al. | 358/260 |
| 4,156,880 | 5/1979 | Yamada | 358/261 |
| 4,212,035 | 7/1980 | Nakagome et al. | 358/260 |
| 4,296,439 | 10/1981 | Teramura et al. | 358/260 |
| 4,492,983 | 1/1985 | Yoshida et al. | 358/260 |

Primary Examiner—Michael A. Masinick

[57] ABSTRACT

An encoding method for facsimile signal which is characterized by encoding data of a line selected out of the all lines of input facsimile signals in a manner of skipping over a predetermined number of lines according to a predetermined encoding method and by encoding the data of one of the thus skipped-over lines from a basic element of higher picture quality contribution judged with reference made to the data of the lines preceding of and/or subsequent to the encoding line which have already been encoded.

3 Claims, 10 Drawing Sheets

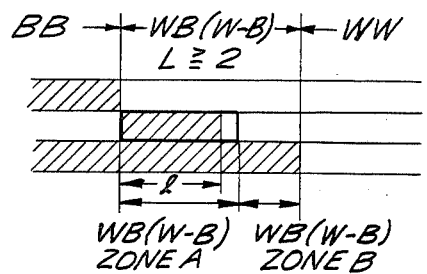
FIG.3 (1)
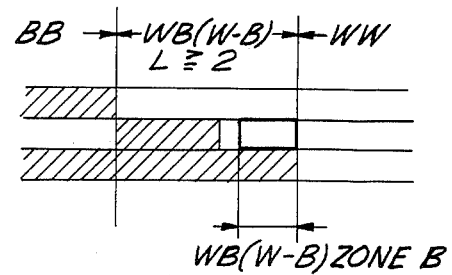
FIG.3 (4)
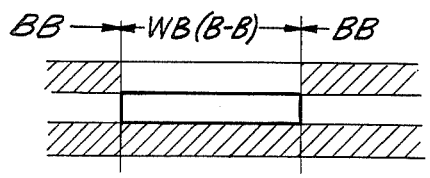
FIG.3 (2)
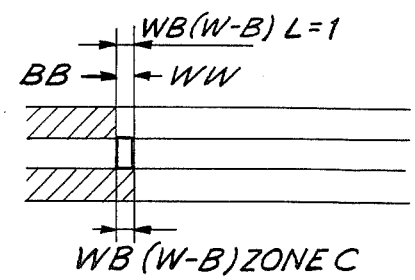
FIG.3 (5)
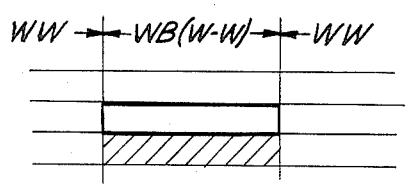
FIG.3 (3)

ENCODING METHOD FOR FACSIMILE SIGNAL

This application is a continuation, of application Ser. No. 519,662, filed Aug. 2, 1983, now abandoned.

BACKGROUND OF THE INVENTION

(1) Field of the Invention

This invention relates to a method of encoding facsimile signal where the quality of reproduced picture images can be freely selected from the receiver side. The invention relates more particularly to a novel encoding method which is suitable when a facsimile terminal is connected with a display unit for conversational mode communication or for picture image data base retrieval.

(2) Description of the Prior Art

Facsimile communication in prior art is the communication from paper to paper with the image of print-out copies. As facsimile communication has been diversified in recent years, a facsimile terminal will be increasingly combined with a display unit for conversational mode picture image communication or picture image data base retrieval. Conventional method which reproduces information consecutively according to the order of scanning lines on a display unit and completes the whole picture image as the scanning of all lines ends may be used for this type of facsimile communication. Alternatively, it is possible to adopt a sequential method which first displays a rough whole image at a higher speed and improves the picture quality gradually thereafter.

In the latter method, receivers can judge if the displayed data satisfies them or not at the early stage when the rough picture image is displayed, and if that is not the desired data, they can stop data transmission so as to save trouble. If the displayed data is the desired one, on the other hand, receivers can continue receiving the transmission until the quality improves to a satisfactory level. They can print out, if necessary, the picture image by using a facsimile terminal. The sequential reproduction method is, therefore, extremely advantageous as it allows free selection of picture quality, faster retrieval and effective use of transmission channels.

SUMMARY OF THE INVENTION

Accordingly, this invention aims at providing a novel encoding method suitable for the sequential reproduction in above-mentioned future type facsimile communication and more particularly, an encoding method which has a higher efficiency in improvement of picture quality for the number of transmission bits thereof.

In order to achieve such objects, in the encoding method according to this invention, out of the information of scanning lines of the input facsimile signal, the data of once in every few lines is encoded first, and then picture elements which have a higher contribution for picture quality are selected from remaining lines by referring to the data on the already encoded line preceding and/or following thereof and the elements are encoded in the order of contribution.

DESCRIPTION OF THE PREFERRED EMBODIMENT

Referring first to an embodiment shown in FIGS. 1 to 3, the principle of the invention will be explained.

Figure 1:
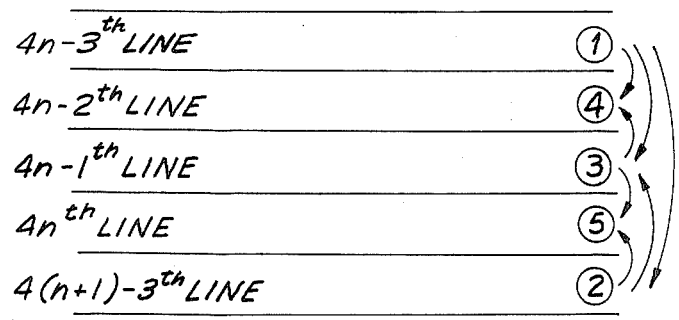
FIG. 1 is a schematic view to explain an example of the order of lines to be encoded.

As shown in FIG. 1, for facilitating understanding, lines are divided into $(4n-3)^{th}$ line from the beginning of the picture image (n is an integer), $(4n-2)^{th}$ line, $(4n-1)^{th}$ line and the $4n^{th}$ line. First, only $(4n-3)^{th}$ line is encoded by a known encoding method such as the Modified Read Method or the Modified Huffman Method, stored, if necessary, and then transmitted. At this time stage, on the receiver side the signals of the line $(4n-3)^{th}$ are decoded and stored, and subsequently displayed to reproduce a rough picture image. It may be possible to supplementarily display the lines of $(4n-2)^{th}$, $(4n-1)^{th}$ and $4n^{th}$ obtained from the data of the $(4n-3)^{th}$ line to make the display easier for eyes.

Referring to the encoded data of the lines of $(4n-3)^{th}$ and $[4(n+1)-3]^{th}$, the intermediate line or the $(4n-1)^{th}$ line is encoded by the procedures (1) through (9) which will be described hereinafter according to the order of picture quality contribution in basic elements. On the receiver side, the signals of the $(4n-1)^{th}$ line transmitted in each procedure are decoded and stored by referring to the data of the decoded lines of $(4n-3)^{th}$ and $[4(n+1)-3]^{th}$, and whenever necessary, only the data of the $(4n-3)^{th}$ and $(4n-1)^{th}$ lines are displayed on the display unit at the end of every procedure, thereby obtaining picture images of which picture quality is being sequentially improved. It is possible to supplementarily display the data of the $(4n-2)^{th}$ and the $4n^{th}$ lines obtained from the data of the $(4n-3)^{th}$ and $(4n-1)^{th}$ lines for easier observation.

When encoding of the $(4n-1)^{th}$ line is completed in the procedures (1) through (9), in a similar manner, the $(4n-2)^{th}$ line which is the intermediate line between the $(4n-3)^{th}$ and the $(4n-1)^{th}$ lines is encoded referring to the lines on both sides, and the $4n^{th}$ line is encoded referring to the $(4n-1)^{th}$ and $[4(n+1)-3]^{th}$ according to the procedures (1) through (9) in the order of picture quality contribution of the basic elements in each line for transmission. The receiver side reacted in the manner similar to the above; i.e. the signals of the $(4n-2)^{th}$ line which are transmitted by each procedure is decoded referring to the data of decoded lines of $(4n-3)^{th}$ and $(4n-1)^{th}$ and stored. The signals of the $4n^{th}$ line transmitted according to each procedure are decoded and stored by referring to the data of the already decoded lines of the $(4n-1)^{th}$ and the $[4(n+1)-3]^{th}$. Whenever necessary, for instance, at each end of the procedures, the data of all lines, i. e. the $(4n-3)^{th}$, the $(4n-2)^{th}$, the $(4n-1)^{th}$ and the $4n^{th}$ are displayed on a display unit. Therefore, the quality of the picture image is sequentially improved to obtain a complete picture image in the end. The numbers ① through ⑤ in FIG. 1 denote the order of the lines to be encoded (which will be referred to an encoding line hereinafter).

Explanation will now be given for an example of the encoding method which encodes from a basic element of a highest quality contribution ratio by referring to preceding and following reference lines. If a basic element can be discriminated to be either white or black faster than other elements so as to grasp the content of the picture image more accurately, then the element has a higher picture quality contribution. For instance, the boundary zone between the black picture element zone and the white picture element zone may be the element with a higher quality contribution. It may be the element of which picture quality is remarkably deteriorated by a prediction failure when the data on the decoded line is predicted from the preceding and/or following reference line data. Alternatively, it may be the element which has a large visual data amount (which is referred to the data amount). The picture quality contribution can be classified by the arrangement of white or black picture elements of the encoded line and the lines on both sides thereof.

Figure 2:
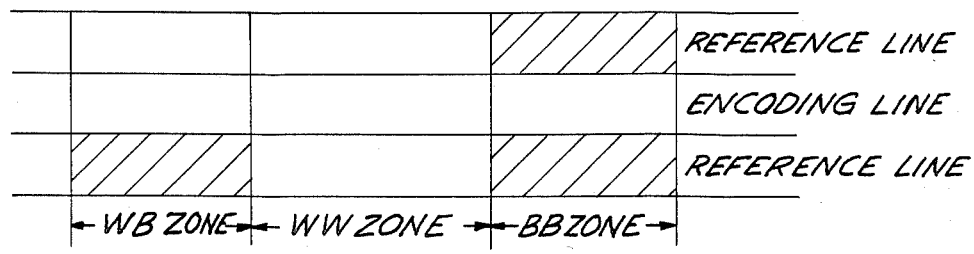
FIG. 2 is a schematic view to describe a method to select basic elements with a higher picture quality contribution ratio.

As shown in FIG. 2, a pair of reference lines on both sides of an encoded line are divided into three zones, a WB zone, a WW zone and a BB zone. In FIG. 2, the hatched zone denotes a black element zone and other zones white element zones. The WB zone denotes a zone where the elements on one of the reference lines are white while the ones on the other reference line are black. The WW zone denotes a zone where elements on both adjacent reference lines are white while the BB zone denotes a zone where elements on both adjacent reference lines are black. Accordingly, a WB zone has a higher picture quality contribution ratio than WW or BB zones. If a WW zone is compared to a BB zone, the BB zone has a higher ratio than the WW zone because in almost all picture images black characters or diagrams are displayed against white background.

The picture quality contribution may be varied in a WB zone by the type of adjacent zones thereto. As shown in FIG. 3(1), if a zone has different adjacent zones, i.e. a WW zone and a BB zone, it has the highest contribution. Such zone is called the WB(W−B) zone. A WB zone sandwiched between BB zones as shown in FIG. 3(2) is called a WB(B−B) zone. A WB zone sandwiched between WW zones is called a WB(W−W) zone. Comparing a WB(B−B) zone with a WB(W−W) zone, due to the reasons similar to the above, a WB(B−B) zone has a higher picture quality contribution.

Figure 3:
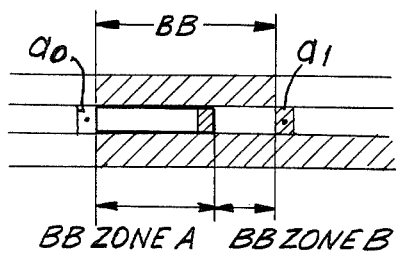
FIGS. 3(1) through (9) are schematic views to explain the encoding procedure.
Figure 3:
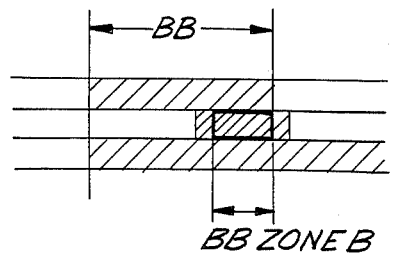
Figure 3:
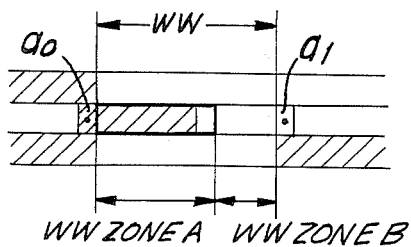
Figure 3:
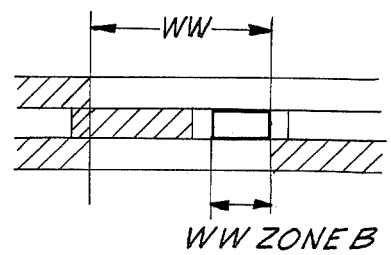

Referring now to FIGS. 3(1) through (9), an embodiment of the encoding method according to this invention will be explained.

Procedure (1): in each encoding line, as shown in FIG. 3(1), only the WB zone of which length L is 2 picture elements or searched more from the end adjacent to the BB zone until the first white picture element appears and the searched zone is encoded. In case no white picture element appears in a WB(w−B) zone having the length L which is 2 or more picture elements, all black elements of the zone are encoded. The zones to be encoded as above are called WB(W−B) zone A as shown in FIG. 3(1). Encoding here is completed simply by encoding the length l of the black elements, and the efficiency in encoding will be improved by encoding the length l of the black elements by referring to the length L of the WB(W−B) zone. Either table 1 or table 2 may be used as the encoding table. Although the length of the WB(W−B) zone is limited to 7 (L≦7) in the tables 1 and 2, l can be simply made binary code by using fixed code length in case of L≧8. The small letter l denotes the length of black picture elements here.

In the procedure (1); The portion after the first appearance of white element is not encoded even if it lies within the WB(W−B) zone of L≧2. The zone is called a WB(W−B) zone B. As the WB(W−B) zone has a higher probability of being white elements, therefore even if it is delayed in encoding, the picture quality will not very much be lowered. In other words, it has a slightly lower quality contribution and this will be encoded later in the procedure (4). In a WB(W−B) zone of L=1, as a picture element is extremely short, the picture element will not very much be affected whether it is white or black. Therefore, this zone will be encoded later in the procedure (5). The WB(W−B) zone of L=1 will be called a WB(W−B) zone C.

Accordingly, all of the lines are encoded in the procedure (1) sequentially and then the procedure (2) will be started.

Procedure (2): Similarly, in each of encoding lines, a WB(B−B) zone is extracted as shown in FIG. 3(2), all picture elements within each WB(B−B) zone are sequentially connected and then connected elements are encoded by line.

TABLE 1

| Length L of WB zone | Length l of black picture elements | | | | | | | |
|---|---|---|---|---|---|---|---|---|
| | 0 | 1 | 2 | 3 | 4 | 5 | 6 | 7 |
| 2 | 10 | 0 | 11 | — | — | — | — | — |
| 3 | 10 | 110 | 0 | 111 | — | — | — | — |
| 4 | 10 | 110 | 00 | 01 | 111 | — | — | — |
| 5 | 00 | 010 | 110 | 10 | 011 | 111 | — | — |
| 6 | 10 | 000 | 1100 | 01 | 001 | 1101 | 111 | — |
| 7 | 00 | 010 | 0110 | 100 | 110 | 101 | 0111 | 111 |

TABLE 2

| Length L of WB zone | Length l of black picture elements | | | | | | | |
|---|---|---|---|---|---|---|---|---|
| | 0 | 1 | 2 | 3 | 4 | 5 | 6 | 7 |
| 2 | 10 | 0 | 11 | — | — | — | — | — |
| 3 | 110 | 10 | 0 | 111 | — | — | — | — |
| 4 | 10 | 110 | 00 | 01 | 111 | — | — | — |
| 5 | 00 | 100 | 101 | 01 | 110 | 111 | — | — |
| 6 | 00 | 101 | 010 | 011 | 100 | 110 | 111 | — |
| 7 | 00 | 010 | 1100 | 1101 | 100 | 101 | 011 | 111 |

Any encoding method may be used but the Run-Length Method is preferable in order to enhance encoding efficiency. The coding table MH(B) for the black run of the MH encoding method may be used for both white and black runs. Tables 3 and 4 show respectively the coding table MH(W) for white run and the coding table MH(B) for black run. Table 3 shows terminating codes and Table 4 makeup codes.

After the procedure (2) is carried on all of the encoding lines sequentially, the operation will proceed to the procedure (3).

Procedure (3): In each of the encoding lines, WB(W−W) zones are extracted as shown in FIG. 3(3), all of the picture elements within each of the WB(W−W) zones are sequentially connected and then the connected elements are encoded by line. Any method may be used but preferably Run-length Method is used for a higher encoding efficiency. As a code table, the WYLE code table shown in FIG. 5 may be used. After having carried out the procedure (3) on all encoding lines, the operation will proceed to (4).

Procedure (4): In each of the encoding lines, the portion which was not encoded in the procedure (1) or the WB(W−B) zone B shown in FIG. 3(4) is extracted, all of the picture elements within each WB(W−B) zone are sequentially connected and then the connected elements are encoded.

TABLE 3

| Run Length | (Terminating code) MH (W) | MH (B) |
|---|---|---|
| 0 | 00110101 | 0000110111 |
| 1 | 000111 | 010 |
| 2 | 0111 | 11 |
| 3 | 1000 | 10 |
| 4 | 1011 | 011 |
| 5 | 1100 | 0011 |
| 6 | 1110 | 0010 |
| 7 | 1111 | 00011 |
| 8 | 10011 | 000101 |
| 9 | 10100 | 000100 |
| 10 | 00111 | 0000100 |
| . | . | . |
| . | . | . |
| . | . | . |
| 60 | 01001011 | 000000101100 |
| 61 | 00110010 | 000001011010 |
| 62 | 00110011 | 000001100110 |
| 63 | 00110100 | 000001100111 |

TABLE 4

| Run Length | (Make-up code) MH (W) | MH (B) |
|---|---|---|
| 64 | 11011 | 0000001111 |
| 128 | 10010 | 000011001000 |
| 192 | 010111 | 000011001001 |
| 256 | 0110111 | 000001011011 |
| 320 | 00110110 | 000000110011 |
| . | . | . |
| . | . | . |
| . | . | . |
| 1600 | 010011010 | 0000001011011 |
| 1664 | 011000 | 0000001100100 |
| 1728 | 010011011 | 0000001100101 |
| EOL | 000000000001 | 000000000001 |

Any method may be used for encoding but preferably the Run-Length Method is used for a higher encoding efficiency. Considering transmission efficiency, the WYLE table is used for white run and MH(B) is used for black run as the coding table.

After completing the procedure (4) on all of the encoding lines, the operation will proceed to (5).

TABLE 5

| Run Length | WYLE Code (* denotes simple binary number) |
|---|---|
| 1~2 | 0 * |
| 3~6 | 10 ** |
| 7~14 | 110 *** |
| 15~30 | 1110 **** |
| 31~62 | 11110 ***** |

Procedure (5): In each of the encoding lines, WB(W−B) zone C of L=1 is respectively encoded. As only one picture element is encoded here, elements can be encoded simply with bit patterns; e.g. a white element is encoded as [0] while a black element as [1]. After completing the procedure (5) on all of the encoding lines, the operation will proceed to (6).

Procedure (6): In each of the encoding lines, as shown in FIG. 3(6) by bold line, only if the picture element $a_0$ or $a_2$ on the outer sides of the BB zone (marked with . in the figure) has already been encoded in the procedures (1) through (5) and is a white element, or if it has not been encoded, the BB zone will be searched from the end until the first black element appears and the searched zone is encoded. In case the picture element $a_0$ and $a_2$ on the sides of the BB zone have been encoded and are white elements or both of them have not been encoded, the BB zone will be searched from a predetermined end and the portion stretching from that end to the first appearance of a black element is encoded. If no black element appears in the BB zone at all, all white picture elements within the BB zone will be encoded. The zone encoded in the above manner will be called BB zone A. Encoding is carried out here by connecting BB zones A and encoding them by line. Any method may be used for encoding but Run-Length Method is preferable for a higher encoding efficiency. As the coding table, [1+2] code table is used for white run as shown in Table 6 while either the WYLE code table or the MH(B) may be used for black run.

A [N+2] code table is the method where N bit codes are used within the Run range of 1 through $2^{n+1}$, and necessary codes are added by 2 bits for the range beyond $2^{n-1}+1$ (provided one of them is a flag bit).

TABLE 6

| Run length | [1 + 2] code (* denotes simple binary number) |
|---|---|
| 1 | 0 |
| 2~3 | 10 * |
| 4~7 | 110 ** |
| 8~15 | 1110 *** |
| 16~31 | 11110 **** |
| 32~63 | 111110 ***** |

The portion after the first appearance of a black element will not be encoded even if it lies within the BB zone in the procedure (6). In case both of the outer end elements $a_0$ and $a_2$ have already been encoded black elements, they are not encoded in the procedure (6). It is called a BB zone B. As it is of a higher probability of being black elements or in other words, as it is of a slightly lower picture quality contribution, it will not very much affect the picture quality and therefore it will be encoded later in the procedure (8).

After having completed the procedure (6) on all of the encoding lines, the operation will proceed to (7).

Procedure (7): In each of the encoding lines, if the picture elements $a_0$ or $a_2$ (marked with . in the figure) on outer sides of a WW zone have already been encoded in the procedures (1) through (6) and are black elements as shown in FIG. 3(7) with a bold line, the WW zone is scanned from the black element side and the portion from that end to the first appearance of a white element is encoded. In case the elements $a_0$ and $a_2$ are both black elements and have already been encoded, the WW zone is searched from a predetermined end until the first white element appears and the searched zone is encoded. If no white element appears in the WW zone at all, all of the black elements in the zone will be encoded. The portion thus encoded is called a WW zone A. Any method may be used for encoding. Each WW zone A may be encoded according to the bit pattern where a white element is expressed as [0] while a black element as [1]. Alternatively, the WW zones are connected with each other and encoded in the Run Length by line.

Due to the reason similar to the procedure (6), the portion after the first appearance of a white element is not encoded even if it lies within the WW zone. Similarly, in the case when both of the outer side elements $a_0$ and $a_2$ are white elements and have already been encoded, it is not encoded. The zone is called a WW zone B and encoded in the last procedure(9).

After having completed the procedure (7) on all of the encoding lines, the operation will proceed to (8).

Procedure (8): In each encoding line, the BB zone B or the zone which has not been encoded in the preceding procedure (6) is encoded as shown in FIG. 3(8). Any method may be used for encoding. For enhancing encoding efficiency, the BB zones B are sequentially connected and encoded in the Run Length by line. As the coding table, it is preferable to use the MH coding table or the [N+2] coding table.

After having completed the procedure (8) on all of the encoding lines, the operation will proceed to the last one (9).

Procedure (9): In each of encoding lines, the WW zone B or the portion of the WW zone which has not been encoded in the procedure (7) is encoded as shown in FIG. 3(9). Any encoding method may be used. For improving encoding efficiency, for instance the WW zone B are sequentially connected and encoded in the Run Length by line. The coding table may be the MH coding table or the [N+2] coding table.

By completing this procedure (9) on all of the encoding lines, all of the zones between two reference lines have been encoded completely.

Figure 4:
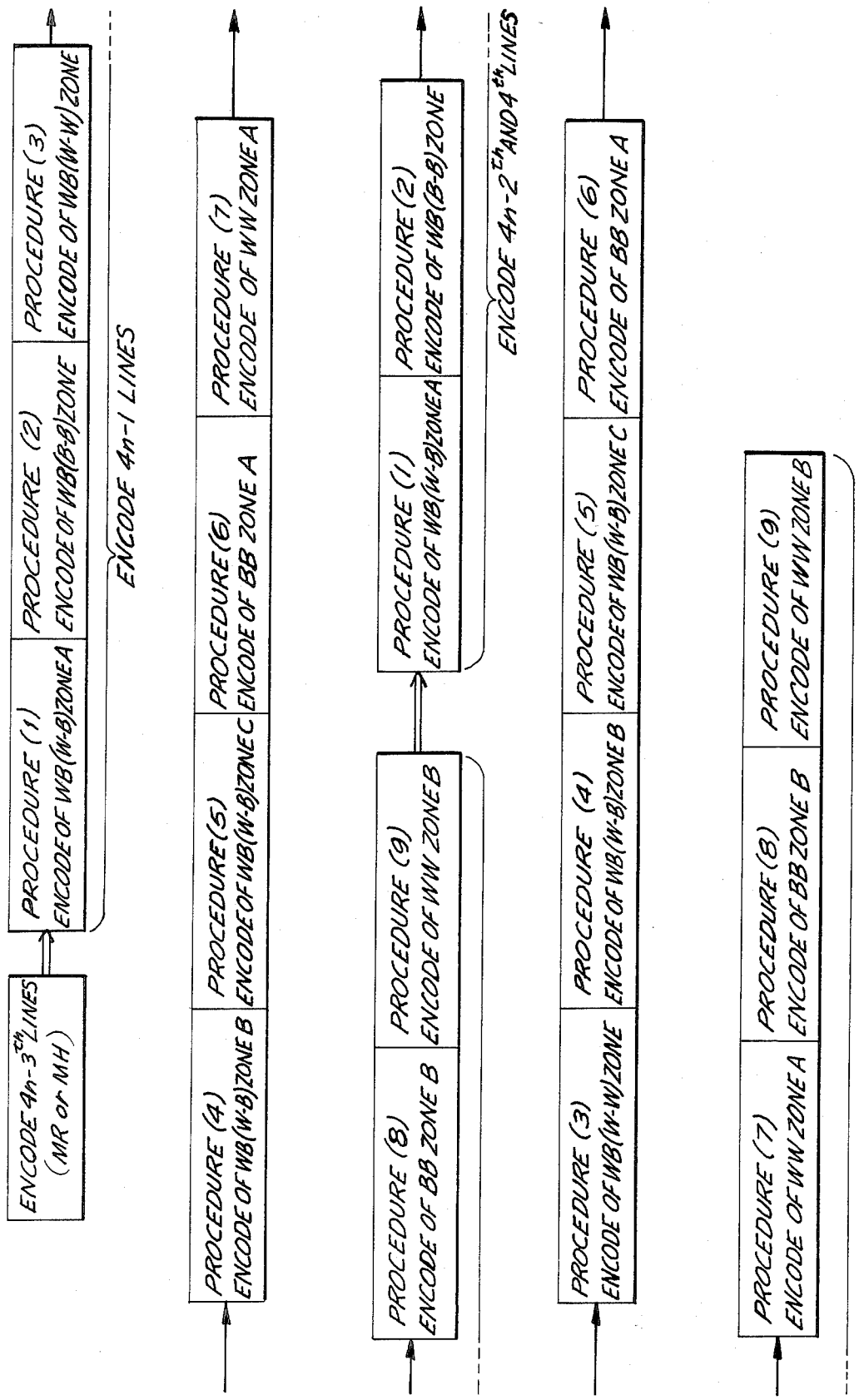
FIG. 4 is a schematic view to explain the order of encoding according to an embodiment of this invention.

Accordingly, in the case of the encoding line order as shown in FIG. 1, only the $(4n-3)^{th}$ line is encoded by the MR method or the MH method as shown in FIG. 4. Then the $(4n-1)^{th}$ line, and the $4n^{th}$ line or the $2n^{th}$ line are encoded according to the procedures (1) through (9). Encoding efficiency will be enhanced both on the receiver side and the transmitter side if white elements are predicted in value for the elements on the encoding lines within the WW zones and the WB zones, while black elements are predicted in value for the elements on the encoding lines in the BB zones, a flag bit is inserted in each line at the time of encoding according to the procedures, and if all the elements in one line coincide with the predicted values, the line is not encoded, but only a flag bit [1] is output. As it is not effective, a flag bit may not be provided for the procedures (1) and (5).

Figure 5:
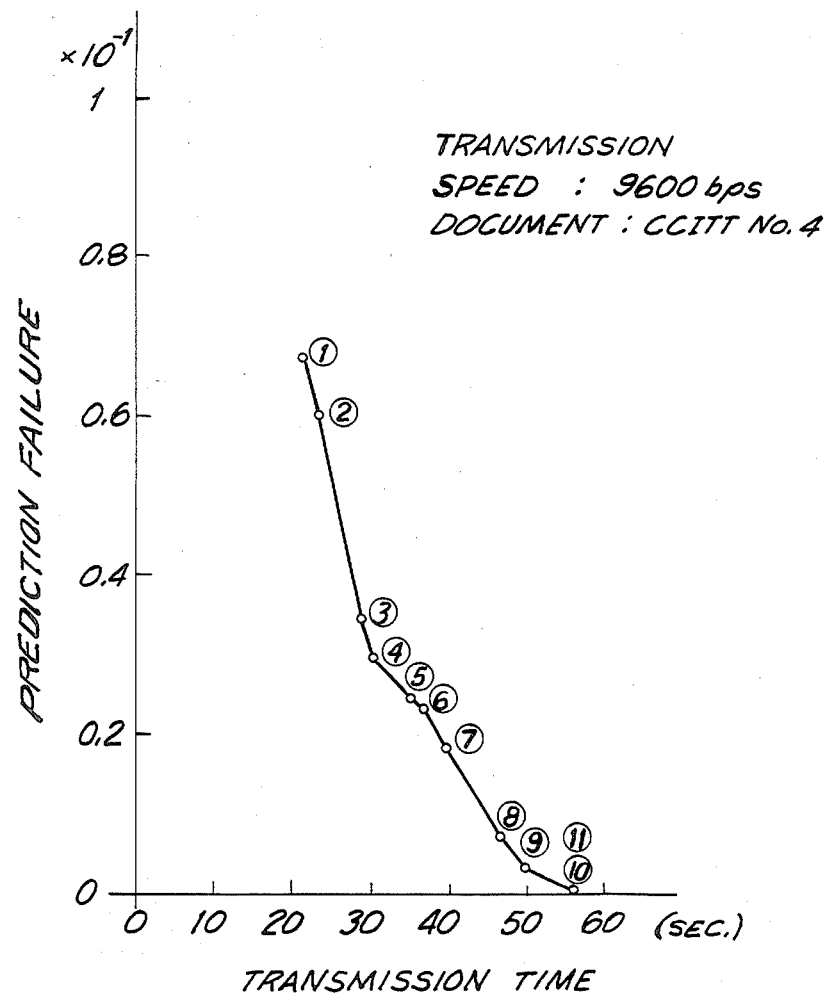
FIG. 5 is a graph to express the result of simulation by the relation between transmission time and prediction failure.
Figure 7:
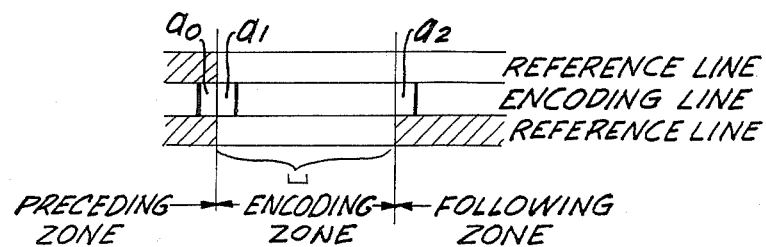
FIG. 7 is an explanatory view of encoding zone and related sections.

Table 7 shows the examples of codes to be used in coding methods mentioned above and the result of simulation using CCITT test documents No. 2 and No. 4. FIG. 5 shows the relation between the transmission time of received pictures ①  through ⑪ and the failure ratio of prediction in the case of using CCITT test document No. 4 at each stage. Table 7 shows the result of the prediction process mentioned above. The failure ratio of the prediction is calculated according to the formula below:

$$\text{Failure ratio} = \frac{\text{number of picture elements where prediction failed}}{\text{Total number of picture elements}} \quad \text{Formula (1)}$$

Table 8 shows the comparison in total code length of the final picture image between the method according to this invention and the MR method.

FIG. 5 indicates that the present invention enables to transmit 93.2% of an original picture image within 40% of the final transmission time and subsequently to improve the picture quality remarkably for the short transmission time. This proves the fact that the elements having higher picture quality contribution are encoded first. Further, Table 8 shows that the method according to this invention has a higher transmission efficiency than the MR method.

TABLE 8

|  | Test-Document | |
|---|---|---|
|  | CCITT No. 2 | CCITT No. 4 |
| present invention | 86004 | 543417 |
| MR (K = ∞) | 86416 | 554185 |

TABLE 7

| | code table | | CCITT test document | | | | | |
|---|---|---|---|---|---|---|---|---|
| | | | No. 2 | | No. 4 | | transmission | received |
| Procedure | white Run Length | black Run Length | code length | total | code length | total | time (sec) | picture No. |
| — | MR (No. 2) or MH (No. 4) | | 40134 | 40134 | 206638 | 206638 | 21.5 | ① |
| 1st time encoding | | | | | | | | |
| 1 | encoding according to Table 1 | | 5393 | 45527 | 19687 | 226325 | 23.6 | ② |
| 2 | MH (B) | MH (B) | 2283 | 47810 | 11866 | 238191 | — | |
| 3 | WYLE | WYLE | 2997 | 50807 | 41719 | 279910 | 29.2 | ③ |
| 4 | WYLE | MH (B) | 1299 | 52106 | 5247 | 285157 | — | |
| 5 | white element → [0] | black element → [1] | 1358 | 53464 | 8334 | 293491 | 30.6 | ④ |
| 6 | [1 + 2] | WYLE | 1172 | 54636 | 13759 | 307250 | — | |
| 7 | white element → [0] | black element → [1] | 1386 | 56022 | 33178 | 340428 | 35.5 | ⑤ |
| 8 | MH (B) | MH (W) | 830 | 56852 | 11815 | 352243 | — | |
| 9 | 11 + 2 | MH (B) | 671 | 57523 | 868 | 353111 | 36.8 | ⑥ |
| 2nd time encoding | | | | | | | | |
| 1 | encoding according to Table 2 | | 6121 | 63644 | 28578 | 381689 | 39.8 | ⑦ |
| 2 | MH (B) | WYLE | 2461 | 66105 | 23359 | 405048 | — | |
| 3 | MH (B) | MH (B) | 3227 | 69332 | 44138 | 449186 | 46.8 | ⑧ |
| 4 | WYLE | MH (B) | 2012 | 7134 | 5969 | 455155 | — | |
| 5 | white element → [0] | black element → [1] | 3810 | 75154 | 22352 | 477507 | 49.7 | ⑨ |
| 6 | length of white element is subjected to MH (B) | — | 4009 | 79163 | 33452 | 510959 | — | — |
| 7 | — | length of black element is subjected to MH (B) | 4359 | 83522 | 28158 | 539117 | 56.2 | ⑩ |
| 8 | [1 + 2] | [8 + 2] | 1198 | 84720 | 3064 | 542181 | — | — |

TABLE 7-continued

| | code table | | CCITT test document | | | | transmission time (sec) | received picture No. |
|---|---|---|---|---|---|---|---|---|
| | | | No. 2 | | No. 4 | | | |
| Procedure | white Run Length | black Run Length | code length | total | code length | total | | |
| 9 | [11 + 2] | [11 + 2] | 1284 | 86004 | 1236 | 543417 | 56.6 | ⑪ |

Referring to FIGS. 6 through 9, embodiments of the circuit structures according to the present invention will be described.

Figure 6:
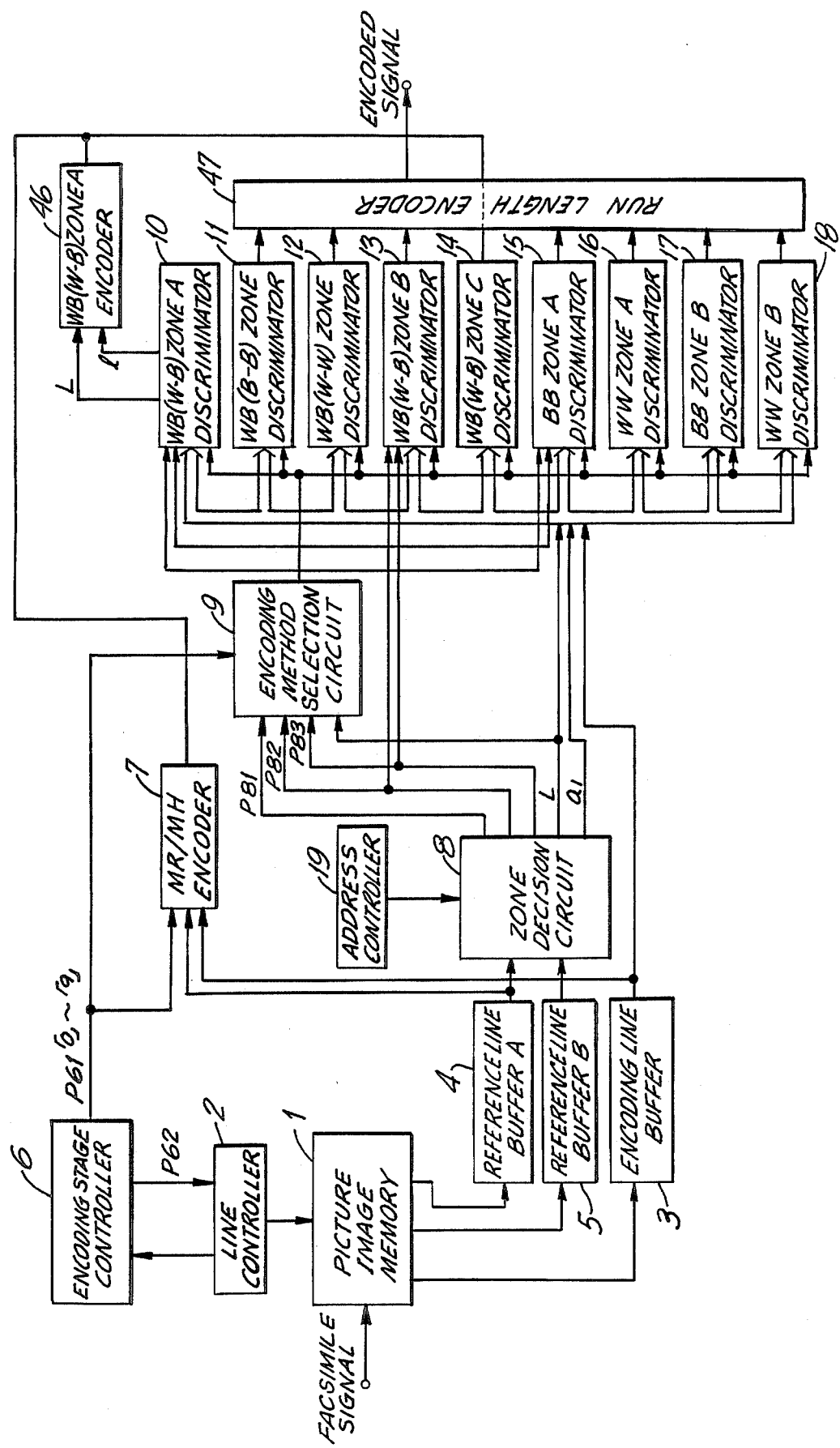
FIG. 6. is a block diagram to show an embodiment of a circuit structure for encoding.

FIG. 6 shows the whole structure of an encoding circuit wherein an input facsimile signal is stored in a picture image memory 1, controlled by the line control circuit 2 to be read out by line and transferred suitably to an encoding line buffer 3, a reference line buffer A4 and a reference line buffer B5. An encoding stage control circuit 6 is the circuit which carries out the first encoding of the $(4n-3)^{th}$ line by the MR method or the MH method, encoding of the $(4n-1)^{th}$ line by the procedures (1) through (9) and encoding of the $(4n-2)^{th}$ and the $4n^{th}$ lines by the procedures (1) through (9) in a predetermined order. When the content of the control signal P61 is [0], it indicates encoding by either the MR method or the MH method. The content of the control signal P61 changes in the order [0]→[1]→[2] . . . [8]→[9]→[1]→[2] . . . [8]→[9] when it is [1] through [9]. (Herein the figure denotes encoding of the corresponding procedures (1) through (9).) The content of the control signal P61 changes from [0] to [1] at the time when the line control circuit 2 has completed read-out control of the line group of the $(4n-3)^{th}$ Every time the read-out control on the line group of the $(4n-1)^{th}$ has been completed, and when the read-out control on the line groups of the $(4n-2)^{th}$ and the $4n^{th}$ lines have been completed, the content sequentially changes thereafter. A control signal P62 of the encoding stage control circuit 6 designates the line group among the $(4n-3)^{th}$, the $(4n-1)^{th}$, the $(4n-2)^{th}$ and the $4n^{th}$ line groups which the line control circuit 2 selects to read-out control. A MR/MH encoding circuit 7 is activated only when the content of the control signal P61 is [0] to encode the line of the $(4n-3)^{th}$ by the MR method or the MH method. A zone discriminating circuit 8 discriminate whether the encoding zone is of WB, BB, or WW zone mode every time the address advances on the encoding line as well as discriminates the modes of the two preceding and subsequent zones. The circuit 8 seeks the top address $a_1$ and the length L of the encoding zone shown in FIG. 7 and outputs the data thereof. The reference number P81 denotes an encoding zone mode signal, P82 a preceding zone mode signal and P83 a subsequent zone mode signal. An encoding method selective circuit 9 discriminates, based upon the modes of the encoding zone and the two adjacent zones and the length L, whether or not the encoding zone at that moment coincides with the zone designated by the content [1] through [9] of the content of the control signal P61 at the encoding stage control circuit 6 and if they coincide, judges which one of zone discriminating circuits 10 through 18 should be used for encoding. Based on the content of the encoding line buffer 3, the length L of the encoding zone, the top address $a_1$ of the encoding zone and the modes of the preceding and subsequent zones, if necessary, the circuit 10 determines the WB(W—B) zone A of the procedure (1), the circuit 11 the BB zone of the procedure (2), the circuit 12 the WW zone of the procedure (3), the circuit 13 the WB(W—B) zone B of the procedure (4), the circuit 14 the WB(W—B) zone C of the procedure (5), the circuit 15 the BB zone A of the procedure (6), the circuit 16 the WW zone A of the procedure (7), the circuit 17 the BB zone B of the procedure (8), and the circuit 18 the WW zone B of the procedure (9) respectively. The circuits 10 through 18 will be described in detail hereinafter.

Figure 8:
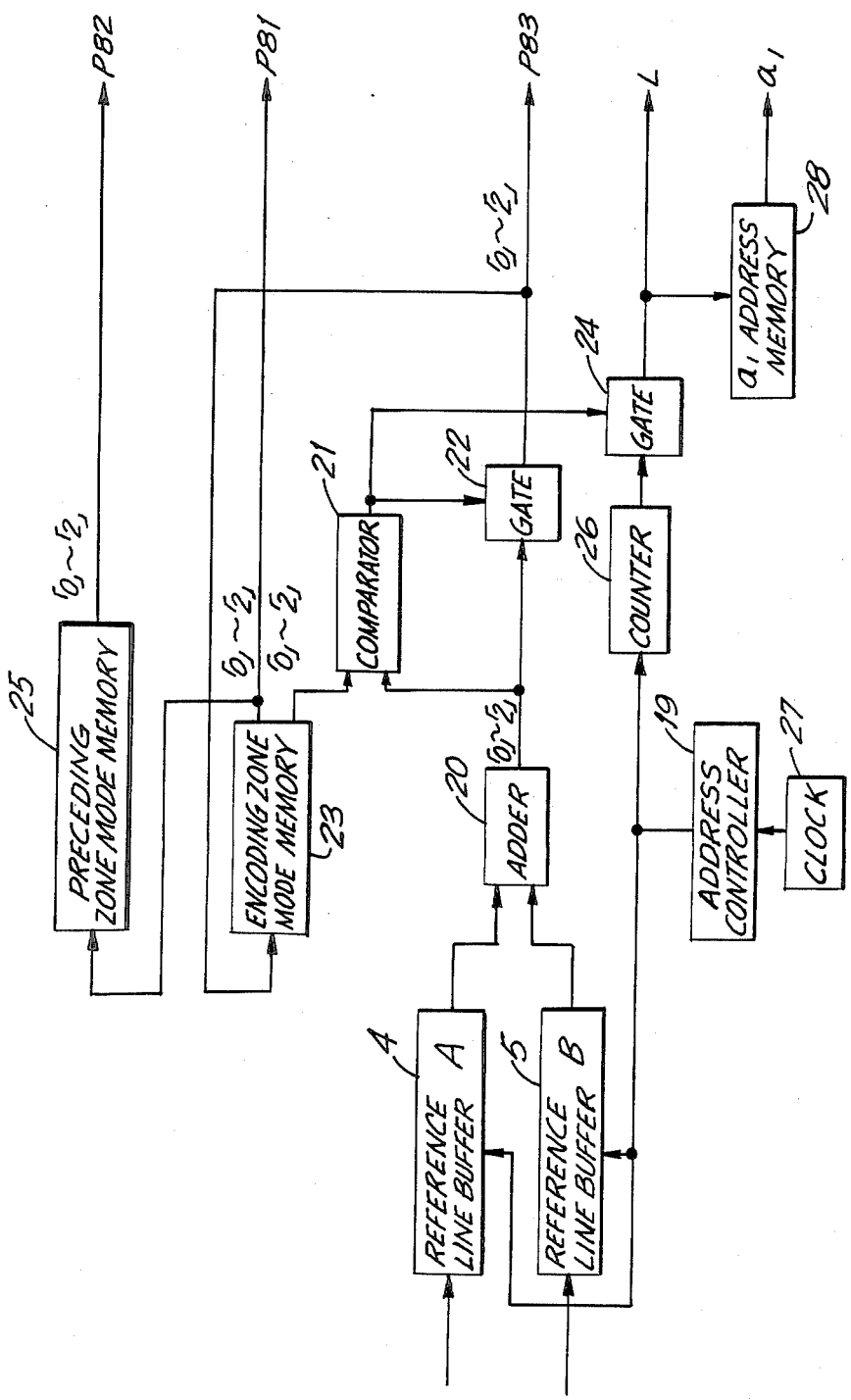
FIG. 8 is a block diagram to show an embodiment of a circuit for zone determination.

An embodiment of the zone determining circuit 8 is described now referring to FIG. 8. In the figure, the data of the two reference lines preceding and subsequent to the encoding line is stored in two reference line buffers 4, 5, and the content of the address indicated by an address control circuit 19 is read out from each reference line buffer and added by an adder 20. If it is assumed that the white picture element is [0] and the black picture element is [1], it indicates the WW zone when the content of the adder is [0], the WB zone when it is [1], the BB zone when it is [2]. The output from the adder 20 is transferred to a comparator 21 and a gate 22. The comparator 21 compares the content of the encoding zone mode memory 23 with the output content of the adder 20 and if they coincide, it outputs 0 while if they don't coincide, it outputs [1]. The output [1] opens the gate 22 and the gate 24. When the gate 22 opens, the content of the adder 20 is output as the subsequent zone mode signal P83 and simultaneously stored in the encoding zone mode memory 23. At that time the content which has already been stored in the encoding zone mode memory 23 is output as the encoding zone mode signal P81 and simultaneously transferred to a preceding zone mode memory 25. Similar to the above, the content which has already been stored in the preceding zone mode memory 25 is output to outside as a preceding zone mode signal P82. A counter 26 receives one pulse from a clock 27 every time address advances by one and counts the same. The content of the counter 26 is cleared after the comparator 21 outputs [1] to open the gate 24. By this arrangement, the gate 24 feeds a signal indicating the length L of the encoding zone for output. When an $a_1$ address memory 28 receives a signal from the counter 26 via the gate 24, it outputs the content which has already been stored therein to outside as a signal indicating the encoding zone top address $a_1$, and then newly stores the sum of the said content and the content of the counter 26.

Figure 9:
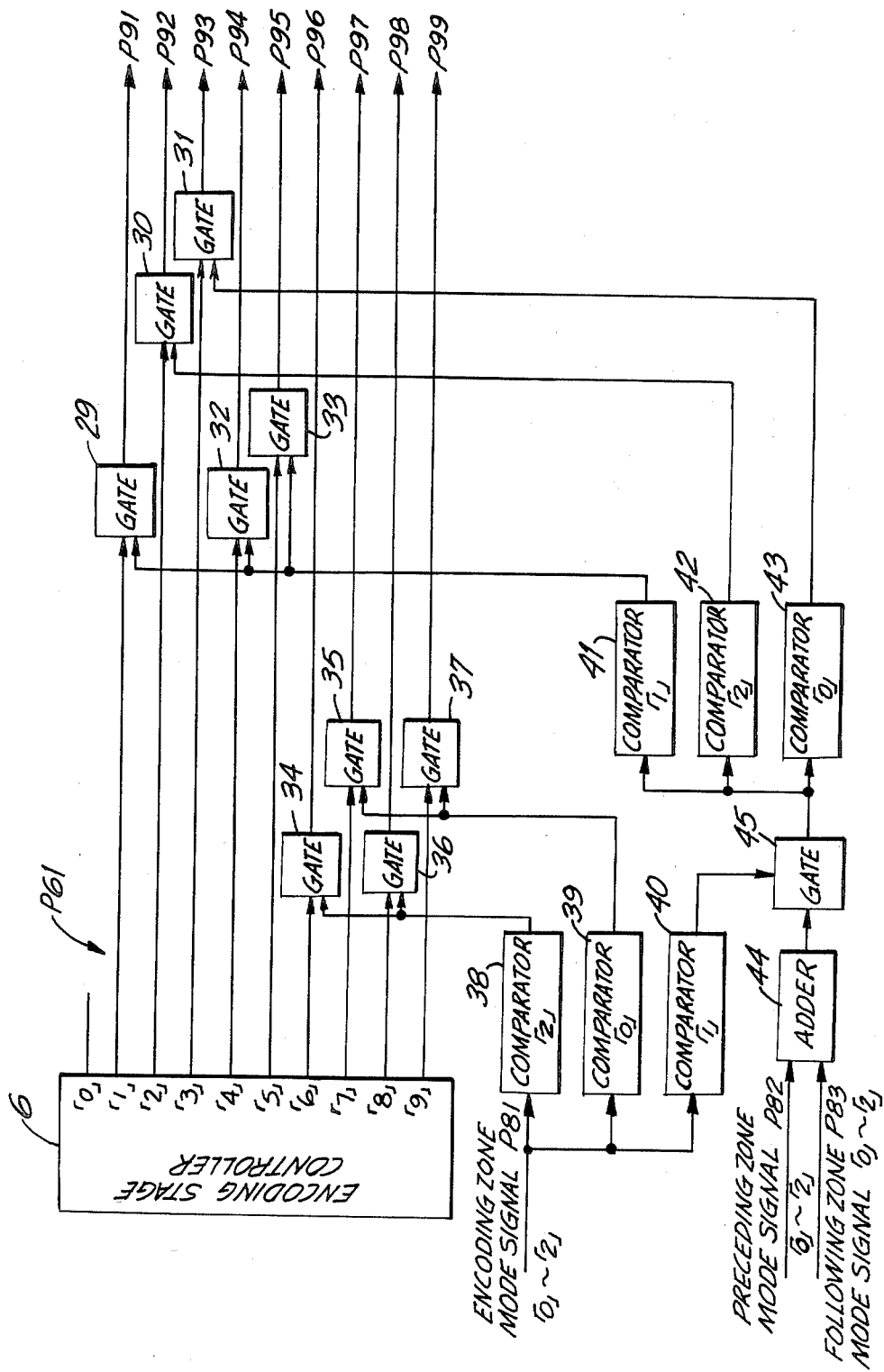
FIG. 9 is a block diagram to show an embodiment of a selective circuit for encoding method.

An embodiment of the encoding method selective circuit 9 is described referring to FIG. 9. In FIG. 9 the control signal P61 of the circuit 6 is decoded into signals which respectively indicates the data [0] through [9]. Either one of the signals corresponds to the designation of a procedure to be [1]. Each signal passes through gates 29 through 37 respectively to be output to the zone determining circuits 10 through 18 corresponding thereto as selective signals P91 through P99. Respective comparators 38 to 43 make the gate open by outputting [1] when respective input values coincide with the subscripts [0], [1], or [2]. The comparator 38 opens the gates 34 and 36 only when the input signal P81 is [2]. That makes the BB zone A the determining circuit 15 to be selected only when the control signal P61 is [6] and when the encoding zone is a zone BB. In a similar manner, only when the control signal P61 is [8] and when the encoding zone is a BB zone, the BB zone B determining circuit 17 is selected. The comparator 39 opens the gates 35 and 37 only when the input signal P81 is [0]. Only when the control signal P61 is [7] and when the zone is a WW, the WW zone A determining circuit 16 is selected. Only when the control signal P61 is [9] and the zone is a WW, the WW zone B determining circuit 18 is selected. A comparator 40 opens a gate 45 of the subsequent stage of an adder 44 when the input signal P81 is [1]. The adder 44 adds the preceding zone mode signal P82 and the subsequent zone mode signal P83. The content of the adding [0], [1] or [2] is input into comparators 41 through 43 via a gate 45. The comparator 41 opens gates 29, 32 and 33 only when the input is [1], the comparator 42 opens a gate 30 only when the input is [2] and the comparator 43 opens a gate 31 only when the input is [0]. By this arrangement, only when the control signal is P61 and the zone is a WB(W−B), the WB(W−B) zone A determining circuit 10 is selected. Similarly, when the signal P61 is [4] and the zone is a WB(W−B) zone, the WB (W−B) zone B determining circuit 13 is selected; when the signal P61 is [5] and the zone is a WB(W−B) zone, the WB(W−B) zone C determining circuit 14 is selected; when the signal P61 is [2] and the zone is a WB(B−B), the WB(B−B) zone determining circuit 11 is selected; and when the signal P61 is [3] and the zone is a WB(W−W), the WB(W−W) zone determining circuit 12 is selected. Accordingly, a suitable zone determining circuit out of circuits 10 through 18 is selected as an encoding zone corresponding to the contents of the control signal P61 [1] through [9].

Explanation will now be given to zone determining circuits 10 through 18. The WB(W−B) zone A determining circuits 10, when selected, is fed with the data of the length L of the encoding zone, the top address $a_1$, and the data to show which one of the preceding and the subsequent zones is a BB zone. Only when $L \geq 2$, the length l of the black picture element in the WB(W−B) zone A is obtained from those data and the content of the encoding line buffer 3 and this length l and the length L of the encoding zone are fed to a WB(W−B) zone A encoding circuit 46. Encoding circuit 46 encodes the WB(W−B) zone A by the combination of L and l according to the codes of the table 1 or 2. A WB(B−B) zone determining circuit 11 extracts the bit pattern of the portion of which address is determinable with $a_1$, and L fed at the time of selection out of the encoding line buffer 3 to transfer to a Run Length encoding circuit 47. The Run Length encoding circuit 47 connects and encodes the thus transferred data by line. The WB(W−W) zone determining circuit 12 extracts the bit pattern of the portion determinable with the $a_1$ and L out of the encoding line buffer 3 to transfer to the encoding circuit 47. The WB(W−B) zone B determining circuit 13 is fed with the data of $a_1$, L and which one of the preceding and the subsequent zones is a BB zone, and only when $L \geq 2$, first determines the WB(W−B) zone A which is determinable only with $a_1$ and L. The circuit 13 then extracts the bit pattern of the portion other than thus determined WB(W−B) zone A from the encoding line buffer 3 to transfer to the Run Length encoding circuit 47. The WB(W−B) zone C circuit 14 extracts the content of the encoding line buffer 3 having the address $a_1$ only when L=1 and outputs it as an encoding signal. The BB zone A determining circuit 15 is fed with the data of $a_1$, L and the preceding and subsequent zones, searches either one of the adjacent outside elements $a_0$ and $a_1$ of the BB zone determinable with $a_1$ and L, extracts the portion which will become a BB zone A from the encoding line buffer 3 and transfers it to the Run Length encoding circuit 47. The reason that the data of preceding and subsequent zone have to be input is because it can judge that if the adjacent zone is a WB zone, the picture element $a_0$ or $a_1$ outside of the encoding zone has already been encoded and if it is a WW zone, that it has not been encoded. A WW zone A determining circuit 16 scans white/black of the picture elements outside the WW zone which is determinable with $a_1$ and L, extracts the portion which becomes a WW zone A out of the encoding line buffer 3 and transfers it to the Run Length encoding circuit 47. A BB zone B determining circuit 17 first determines a BB zone A out of the BB zone determinable with $a_1$ and L, extracts the bit pattern of the portion other than thus determined zone from the encoding line buffer 3 and transfers the same to the Run Length encoding circuit 47. A WW zone B determining circuit 18 first determines a WW zone A out of the WW zones determinable with $a_1$ and L, extracts the bit pattern of the portion other than thus determined zone and transfers the same to the Run Length encoding circuit 47.

For facilitating the explanation in the above description on the circuit structures, the description and the illustration on the timings on each circuit or the initial values of memories are omitted. Similarly on respective procedures (2) to (4) and (6) to (9), explanation on the encoding is omitted for setting predicted values and if the values are correct, flags alone are raised.

Figure 10:
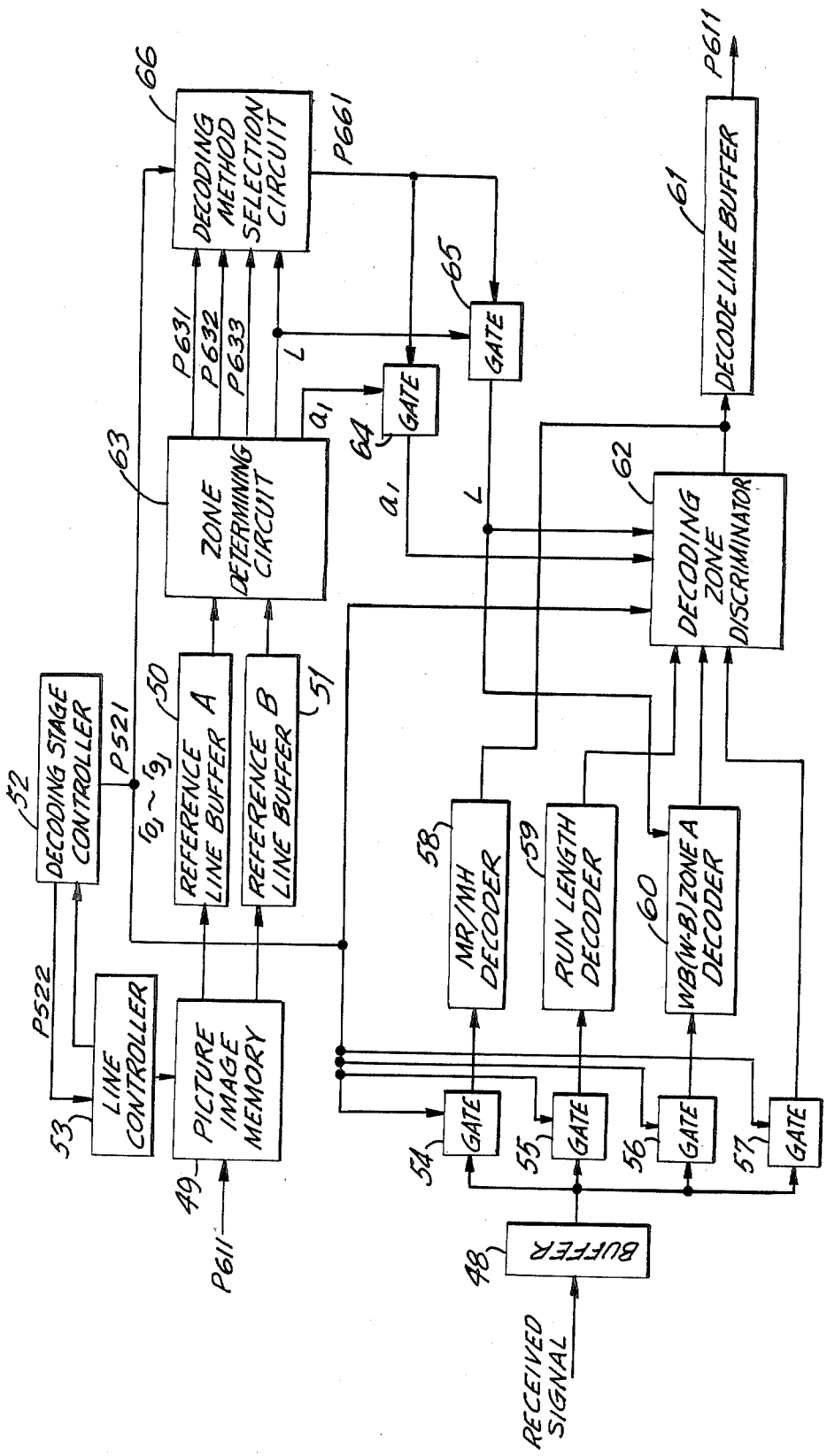
FIG. 10 is a block diagram to show an embodiment of a decoding circuit.
Figure 11:
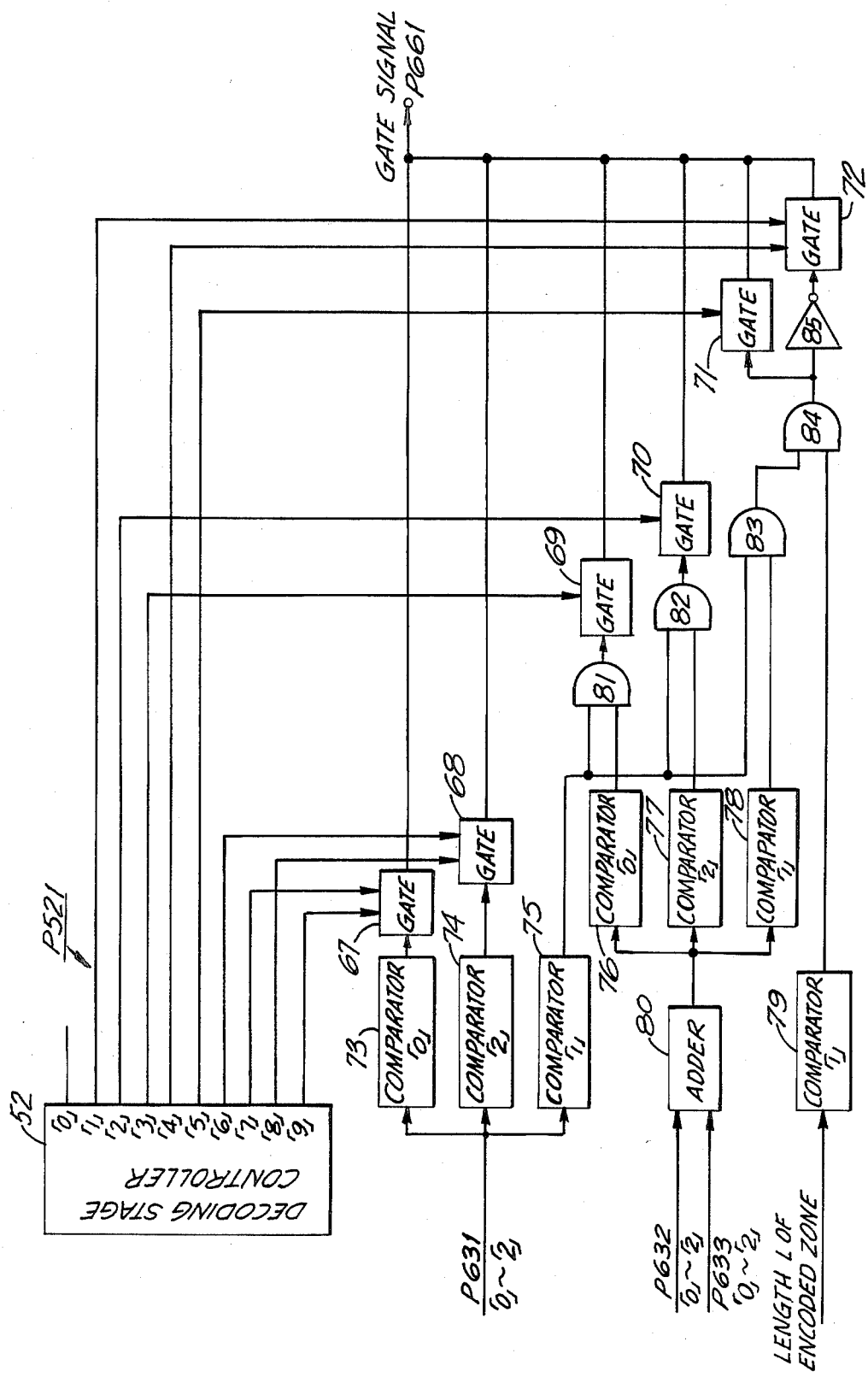
FIG. 11 is a block diagram of an embodiment of a decoding method selective circuit.

Referring now to FIGS. 10 and 11, an embodiment of the decoding circuit structure according to the present invention will be described. The description and the illustration will be omitted likewise for the initial values of memories and the timings at each circuit in order to simplify the explanation. The description on the process such as to supplement unreceived data or to predict the same on the receiver side are also omitted.

FIG. 10 shows the whole structure of a decoding circuit wherein encoded input signals are stored first in an input buffer 48 in order to synchronize the timings of inputs and of each decoding circuit. A picture image memory 49 stores the data of each line sequentially in the order of decoding. The data of the decoded lines preceding or subsequent to the decoding line is read out to be transferred to two reference line buffers A and B, 50, 51. A decoding stage control circuit 52 outputs a control signal P521 having a content identical to the encoding stage control circuit 6, commands to decode by the MH method or the MR method when the content of the signal P521 is 0, and commands to decode for the procedures (1) through (9) corresponding to respective figures when the content is [1] through [9]. In a manner similar to the case of encoding, the content of the signal P521 changes as follows: [0]→ [1]→[2] . . . [8]→[9]→[1]→[2] . . . [8]→[9]. A decoding stage control circuit 52 commands with a control signal P522 which one of the $(4n−3)^{th}$ line group, the $(4n−1)^{th}$ line group, the $(4n\ 2)^{th}$ line group and the $4n^{th}$ line group should be write-in controlled or which line should be read-out controlled as the reference line necessary for decoding. The content of the signal P521 changes from [0] to [1] when the write-in control on the $(4n−3)^{th}$ line group by the line control circuit 53 has been completed. It also changes whenever the write-in control ends on the $(4n-1)^{th}$ line group or the $(4n-2)^{th}$ and the $4n^{th}$ line group.

Respective gates 54 through 57 open according to the content of the control signal P521 from the decoding stage control circuit 52. More particularly, the gate 54 opens when the content is [0], the gate 55 opens when the content is [2], [3], [4], [6], [7], [8], and [9], the gate 56 opens when the content is [1], and the gate 57 opens when the content is [5]. Respective decoding circuits 58, 59 and 60 input data from the input buffer 48 by bits in a necessary number when gates open. As the data out of the outputs from the input buffer 48 which has passed the gate 54 has already been encoded by either the MR or the MH method, it is decoded correspondingly by the MR/MH decoding circuit 58 by either MR or MH method. As all of the data of the $(4N-3)^{th}$ line is output from the decoding circuit 58, they are directly stored in a decoding line memory and then stored in a picture image memory 49. The data which passed through the gate 55 is Run Length encoded; therefore, it is decoded by a Run Length decoding circuit 59 correspondingly. The data which has passed through the gate 56 is encoded according to the code tables 1 or 2; therefore, it is decoded by a decoding circuit 60 using the table 1 or 2 correspondingly. The length L of the WB(W−B) zone necessary to refer to the code table is input to a decoding circuit 60. As the data which has passed through the gate 57 is the bit pattern (provided 1 bit) itself of the WB(W−B) zone C of L=1, it does not need any decoding circuit. Although it is known from which lines the outputs from the WB(W−B) zone A decoding circuit 60 and the outputs from the gate 57 are extracted, they should be divided into picture element patterns of each zone at the time of encoding because they are the signals formed by combining picture element patterns of skipping zones. That is clearly shown in the encoding procedure. By referring to the content of the signal P521 from the decoding stage control circuit 52 and by using the top address $a_1$ and the length L thereof, it is possible to obtain the zone stretching from the address determined by the top address $a_1$ of the decoding zone to a suitable point, thereby enabling to determine the zone by the decoding zone determining circuit 62. The picture element patterns which are decoded to fill in the zone are input into the decoding line memory 61 and then transferred to a predetermined line of the picture image memory 49. The reference numeral P611 denotes a signal which is transferred from the decoding line memory 61 to the picture image memory 49. As $a_1$ and L are not to be transferred, a zone determining circuit 63 having a structure identical to that of the zone determining circuit 8 used for encoding is employed so that $a_1$ and L can be obtained from the data of the lines preceding and subsequent to the decoding line which have already been decoded. The data of $a_1$ and L are fed to a decoding zone determining circuit 62 via the gates 64 or 65 respectively. Disregarding which procedure is used for encoding of the data of the decoding line, a zone determining circuit 63 outputs $a_1$ and L every time the zones of WB, WW and BB change: therefore, $a_1$ and L of the zones which are the subjects in each stage 8 0] through [9] of decoding should be extracted.

FIG. 11 shows an embodiment of a gate signal P661 of a decoding method selective circuit 66 which controls open/close of said gates 64 and 65. In FIG. 11 the control signal P521 of the decoding stage control circuit 52 is decoded into signals which respectively indicate the data of [0] through [9]. Only one of the signals becomes [1] corresponding to the stage of decoding. Only the control signal is 1, the gates 67 through 72 will open. Only when respective input values coincide with the subscripts [0], [1], or [2], respective comparator 73 through 79 outputs [1]. The comparators 73 through 75 input a decoding zone mode signal P631 which assumes [0] when the encoding zone is a WW zone, [1] when the zone is a WB and [2] when the zone is a BB zone. The comparators 76 through 78 inputs the result of adding of an adder 80 which inputs the preceding zone mode signal P632 and the subsequent zone mode signal P633. The preceding zone mode signal P632 and the subsequent zone mode signal P633 assume [0] when the zone is a WW, [1] when the zone is a WB and [2] when the zone is a BB. A comparator 79 inputs the value of the length L of the encoding zone and outputs [1] when L=1. The reference numerals 81 through 84 denote AND circuits, 85 a NOT circuit. The outputs from comparators 73 through 74 are given directly to gates 67, 68 while the outputs from comparators 75 through 78 are fed to the gates 69 through 72 after mutual logical operations. By this arrangement, the top address $a_1$ of a correct encoding zone and the length L thereof are fed to a decoding zone determining circuit 62. For instance, $a_1$ and L of the WB(W−B) zone of L≧2 for decoding by the procedures (1) (4), $a_1$ and L of the WB(B−B) zone for decoding by the procedure (2), $a_1$ and L of the WB(W−W) zone for decoding for the procedure (3), $a_1$ and L of the WB(W−B) zone of L=1 for decoding by the procedure (5), $a_1$ and L of the BB zone for decoding by the procedures (6) and (8) and $a_1$ and L of the WW zone for the decoding by the procedures (7) and (9).

The order of the encoding lines is not restricted to be once every three numbers or the $(4n-3)^{th}$—the $(4n-1)^{th}$—the $(4n-2)^{th}$—the $4n^{th}$ as described in the foregoing. In essence, encoding may be carried out one line by one line or by skipping a suitable and arbitral number of lines or jumping over an arbitral number of lines. For skipped over lines, basic elements having a higher picture quality contribution ratio is sequentially encoded. Though it may be depending on the number of lines jumped over, the number of dividing remaining lines is not limited to be 2 but it may be 1 or 3. The order of the encoding with the reference to preceding or subsequent to the line is also not limited to the procedures (1) through (9) mentioned above, but may be decided from the standpoint that it should begin from the basic element of a higher contribution ratio. Even when the corresponding zones are encoded according to the procedures (1) through (9), any known encoding method may be used.

As described in the foregoing, as the basic element of a higher contribution ratio is sequentially encoded, the encoding method for facsimile signals according to the present invention enables to improve the picture quality remarkably for the transmission time, to reduce the transmission time required to obtain the final picture image and to be effectively applied for the facsimile communication of conversational mode or that for picture image data base retrieval.

We claim:

1. In an encoding method for facsimile signal, wherein data on a field of lines of input facsimile signals are selectively encoded according to a predetermined encoding method between lines which are encoded by skipping over a predetermined number of lines, and wherein data of one of the thus skipped over lines is encoded by making reference to the data of lines already encoded which are preceding and subsequent to said one skipped over line, and wherein the lines of an entire picture are arranged in successive groups each having a plurality of lines, a method of encoding data of a skipped line including the steps of:

skipping corresponding lines in each group to designate skipped and non-skipped lines to be encoded in each group, each group comprising at least one skipped line bounded by a preceding non-skipped line and a succeeding non-skipped line;

first encoding the non-skipped lines in each of said groups to produce a rough image of the entire picture, said step of encoding including determining boundary zones of black and white regions in said picture by the arrangement of white and black picture elements in successive in non-skipped lines;

secondly, after encoding the non-skipped lines in all of said groups of the entire picture, encoding data of one skipped line in each of said groups on the basis of a boundary zone between a black picture elemental zone and a white picture elemental zone in accordance with a predetermined encoding process to produce a better image of the entire picture, said encoding of a skipped line being based on locations of black and white picture elements in non-skipped lines preceding and subsequent to each skipped line in each one of said groups;

repeating said encoding step for skipped lines lying between previously encoded lines in successive ones of said groups to provide a still higher quality image of the entire picture; and, if there be remaining uncoded skipped lines, repeating said encoding step for the remaining uncoded skipped lines in said field based on data of adjacent coded lines to provide a still better quality image of the entire picture, the amount of said repeating being selectable to provide a desired quality of facsimile transmission signal.

2. A method according to claim 1 wherein the step of encoding data of a skipped line based on adjacent coded lines comprises the steps of;

scanning a preceding coded line to measure the content of black and white regions thereof;

scanning a subsequent coded line for measuring the content of black and white regions thereof;

establishing a correspondence between black and white regions of said preceding line with black and white regions of said subsequent line; and identifying correspondences between regions of said preceding and said subsequent lines with code words, said code words designating values of black and white regions to be employed for reconstruction of the skipped line.

3. In a system for encoding a facsimile signal, wherein data on respective lines of input facsimile signals are selectively encoded according to a predetermined encoding method by skipping over a predetermined number of lines, and wherein data of one of the skipped over lines in each of a set of groups of the lines is encoded by making reference to the data or lines already encoded which are preceding and subsequent to said one skipped over line, and wherein skipping corresponding lines in each group serves to designate skipped and non-skipped lines to be encoded in each group; the system comprising:

storage means for storing successive lines in the field of a picture to be transmitted by facsimile;

outputting means coupled to said storage means for outputting successive non-skipped lines to be encoded;

means coupled to said outputting means for encoding said non-skipped lines;

buffer means coupled to said storing means for outputting a skipped line; and logic means coupled to said buffer means and to said outputting means for determining the locations of zones of black and white regions in said picture, said logic means including a plurality of discriminators responsive to black and white content of elemental picture zones in said non-skipped lines for signaling the presence of predetermined arrangements of elemental picture zones, said logic means further comprising second encoding means responsive to said discriminiators for encoding a skipped line in accordance with an arrangement of black and white elemental picture elements in non-skipped lines on opposite sides of a skipped line to be encoded; and wherein said first-mentioned encoding means encodes data of one skipped over line in each of said groups on the basis of a boundary zone between a black picture elemental zone and a white picture elemental zone in accordance with a predetermined encoding principle, the encoding of said first encoding means occurring prior to the operation of said second encoding means to produce a rough image of the entire picture; and said second encoding means of said logic means provides for an encoding of a skipped over line in each of said groups to provide an image of improved quality of the entire picture.

\* \* \* \* \*